United States Patent [19]
Shiraishi

[11] Patent Number: 5,136,416
[45] Date of Patent: Aug. 4, 1992

[54] OPTICAL SCANNING UNIT FOR USE IN LASER BEAM PRINTER OR THE LIKE

[75] Inventor: Takashi Shiraishi, Tokyo, Japan

[73] Assignee: Kabushiki Kaisha Toshiba, Kawasaki, Japan

[21] Appl. No.: 570,849

[22] Filed: Aug. 22, 1990

[30] Foreign Application Priority Data

Aug. 31, 1989 [JP] Japan ................................. 1-225454

[51] Int. Cl.⁵ ............................................. G02B 26/10
[52] U.S. Cl. ................................... 359/217; 359/219; 346/108; 358/296
[58] Field of Search ............... 359/216, 217, 218, 219; 346/108; 358/296

[56] References Cited

U.S. PATENT DOCUMENTS

| | | | |
|---|---|---|---|
| 4,297,713 | 10/1981 | Ichikawa et al. | 346/108 |
| 4,627,685 | 12/1986 | Sakuma | 359/217 |
| 4,758,059 | 7/1988 | Sakuma | 359/217 |
| 4,818,046 | 4/1989 | Kondo | 359/217 |
| 4,875,748 | 10/1989 | Matsumoto et al. | 359/217 |

FOREIGN PATENT DOCUMENTS 177512 7/1989 Japan ................................. 359/216
200221 8/1989 Japan ................................. 359/216

*Primary Examiner*—Loha Ben
*Attorney, Agent, or Firm*—Foley & Lardner

[57] ABSTRACT

In an optical unit for a laser beam printer, a laser beam generated by a laser diode is converted by a group of conversion lenses into a laser beam having a cross section of predetermined-size. The laser beam is directed toward a photosensitive body by a scanner, so as to scan the photosensitive body at a nonuniform speed. A focusing lens focuses the laser beam on the surface of the photosensitive body. The conversion lenses includes at least one aspheric-surface glass lens. The reflecting faces of the scanner are convex and are so formed as to satisfy the inequality R/Z<0.5, where R is the maximum radius of curvature with respect to a main scanning direction, and Z is the shortest distance between a point of reflection (or a point of deflection) and an object to be scanned. The focusing lens is an aspheric-surface lens having a toric surface which is rotation-symmetric with reference to an axis extending in the main scanning direction.

8 Claims, 11 Drawing Sheets

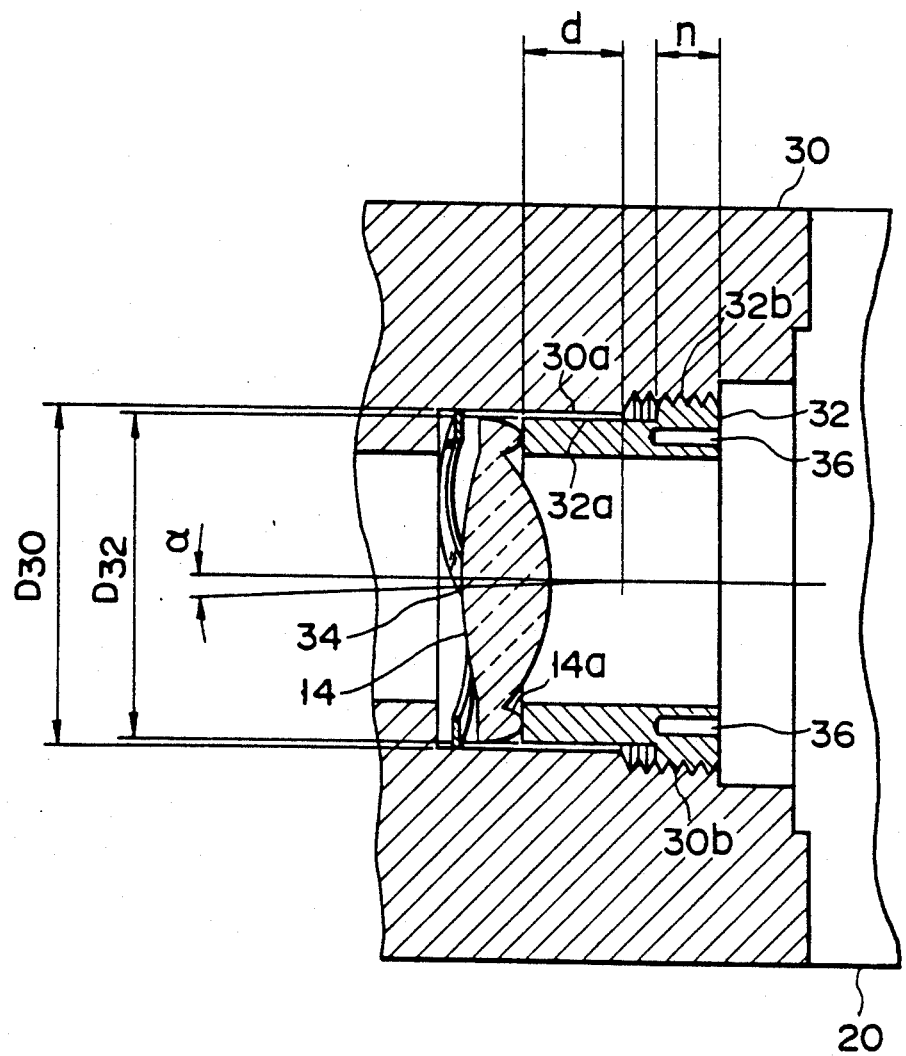
F I G. 4

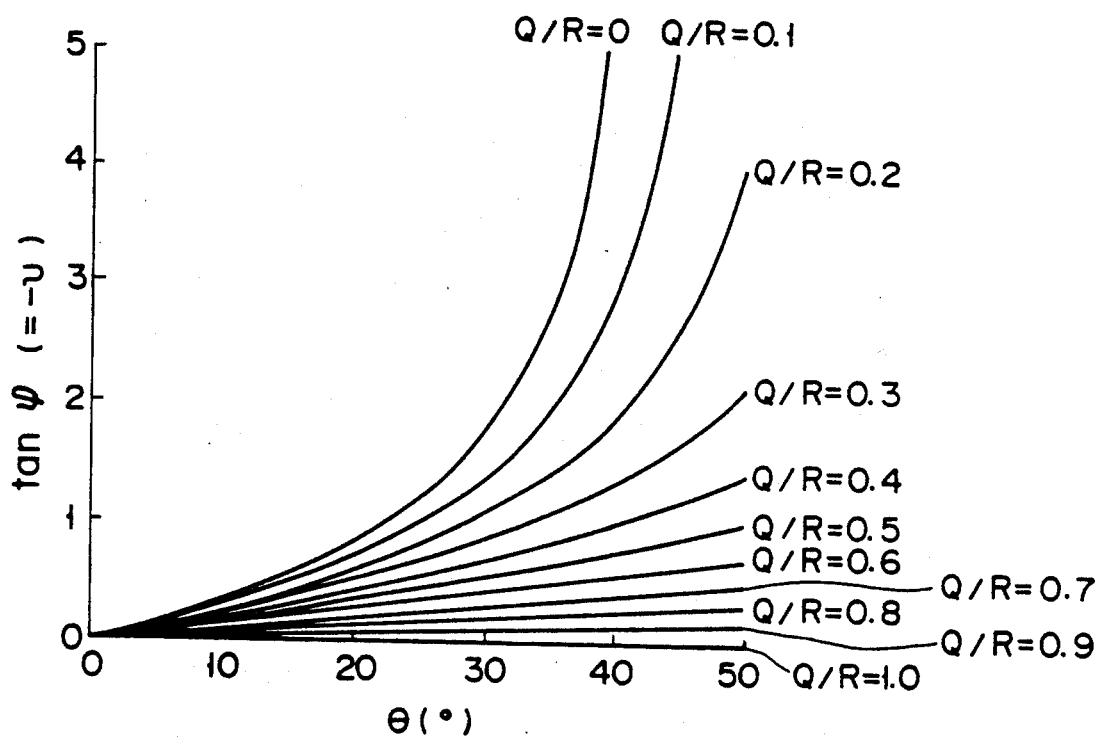
F I G. 10

OPTICAL SCANNING UNIT FOR USE IN LASER BEAM PRINTER OR THE LIKE

BACKGROUND OF THE INVENTION

1. Field of the Invention

The present invention relates to an optical unit for use in a laser beam printer, and more particularly to an optical unit which guides a laser beam from a laser diode to an object to be scanned, through a group of focusing lenses and a scanner.

2. Description of the Related Art

In general, an optical unit incorporated in a laser beam printer or the like is designed such that a laser beam output from a laser diode is guided first to a scanner and then to a photosensitive body, i.e., an object to be scanned. The photosensitive body is scanned with the laser beam at a constant speed. When guided from the laser diode to the photosensitive body, the laser beam passes through a group of focusing lenses. By these focusing lenses, the laser beam is made to have a cross sectional shape having desirable characteristic, and then fall on the predetermined position on the surface of the photosensitive body.

This type of optical unit is made up of first and second optical systems which are isolated from each other. The first optical system converges the laser beam output from the laser diode, while the second optical system focuses the laser beam on photosensitive body. The scanner is arranged on between the first and second optical systems, as will be detailed later.

The first optical system is a combination of lenses, such as an aspheric glass lens, plastic lenses, etc. The second optical system is a combination of lenses, such as an f$\theta$ lens, etc. By this f$\theta$ lens, the deflection angle at which a laser beam is deflected by the scanner is changed in proportion to the position at which the laser beam is focused on the photosensitive body and which is expressed in relation to the main scanning direction.

The optical unit can be classified as either a pre-object type or a post-object type, depending upon the arrangement among the first optical system, the second optical system, and the scanner. If only the second optical system is used for focusing, the optical unit is classified as a pre-object type. If the scanner is interposed after the focusing optical systems, the optical unit is classified as a post-object type.

U.S. Pat. No. 4,627,685 discloses a post-object type optical unit, wherein a scanner is constituted by a polygonal mirror whose mirror faces are part of convex cylinders. In the optical unit disclosed in the U.S. patent, the field curve of the laser beam or image focused on the photosensitive body can be reduced. However, where convex cylindrical mirrors are employed, as in this U.S. patent, the f$\theta$ characteristic remains uncorrected. In addition, a variation in the cross sectional size of a laser beam used for scanning a photosensitive body also remain uncorrected.

SUMMARY OF THE INVENTION

Accordingly, an object of the present invention is to provide an optical unit which is to be incorporated in a laser beam printer or the like, and which allows easy correction of not only the field curve but also a variation in the position and cross sectional size of a laser beam focused on a photosensitive body.

Another object of the present invention is to provide an optical unit which allows easy correction of not only the field curve but also the f$\theta$ characteristic with reference to a photosensitive body.

Still another object of the present invention is to provide an optical unit which removes a ghost laser beam reflected onto the photosensitive body.

A further object of the present invention is to provide a lens-holding structure, which is to be incorporated in an optical unit employed in a laser beam printer or the like, allows easy adjustment of the focal lengths of the lenses, and allows assembly of structural components with high accuracy.

A still further object of the present invention is to provide an optical unit which permits various optical characteristics to be improved together or individually, is compact in size, and can be manufactured at low cost by use of low price members or parts.

The present invention provides an optical unit used for a printer apparatus comprising means for generating a light-beam; means, including a plurality of reflecting faces, for reflecting the light beam from the generating means toward an object, so as to deflect the light beam at a nonuniform angular velocity in accordance with rotation of the reflecting faces; and means for guiding the reflected light beam to the object to scan the object at a constant speed with the light beam having a predetermined beam spot size on the object.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 4 is an enlarged sectional view showing, in detail, the glass lens assembled in the lens barrel shown in FIGS. 3A–3C, together with the neighboring region;

FIG. 10 a graph showing "tangent $\phi$", a ratio of the rotational angle of the scanner to the deflection angle of the laser beam directed from the scanner to the photosensitive body, with using as a parameter a ratio of the radius of curvature of the mirror of the scanner in the main scanning direction to the radius of an inscribed circle of the mirror.

DETAILED DESCRIPTION OF THE PREFERRED EMBODIMENT

An embodiment of the present invention will now be described, with reference to the accompanying drawings.

Figure 1A:
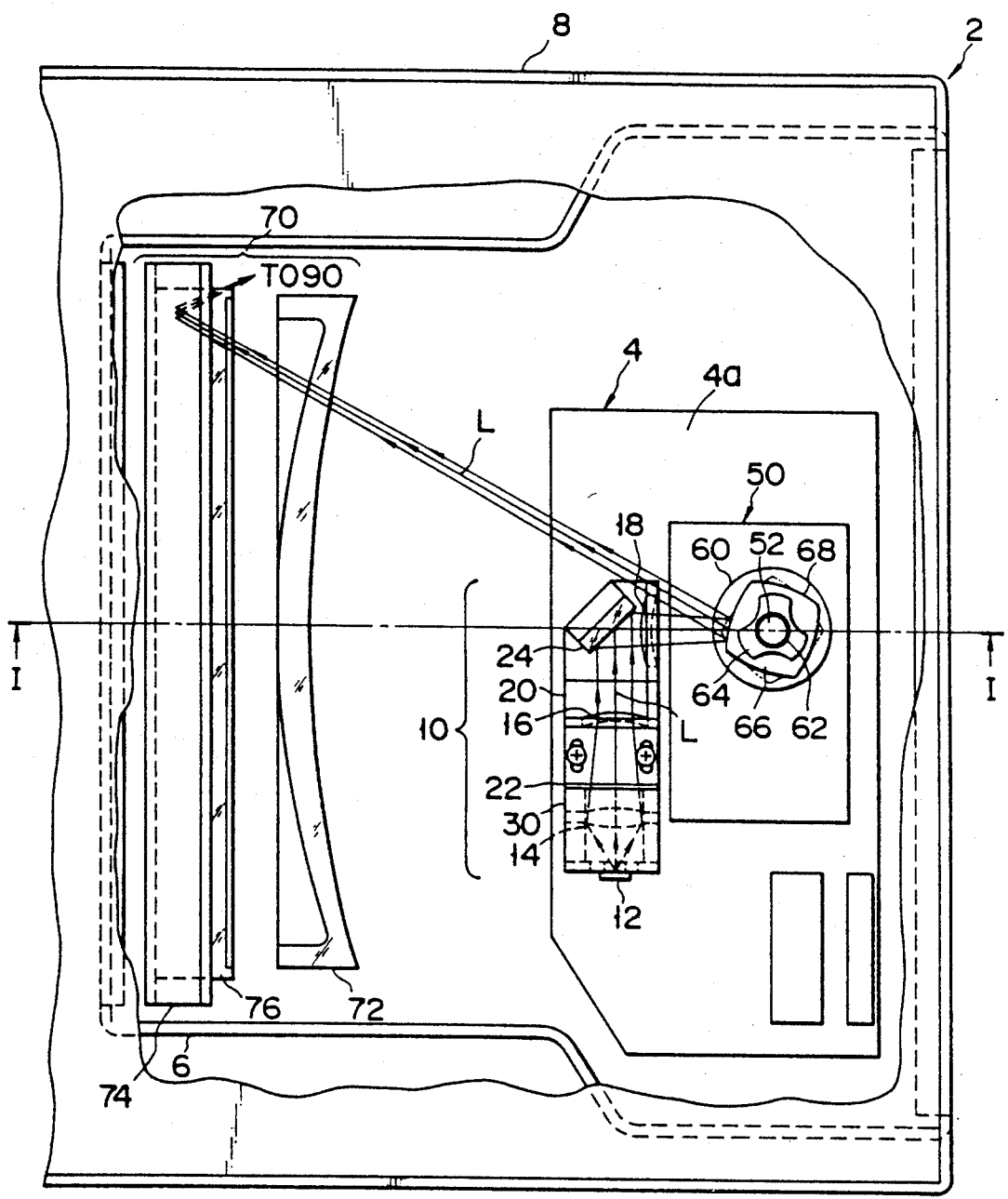
FIG. 1A is a plane view of an optical unit according to one embodiment of the present invention.
Figure 1B:
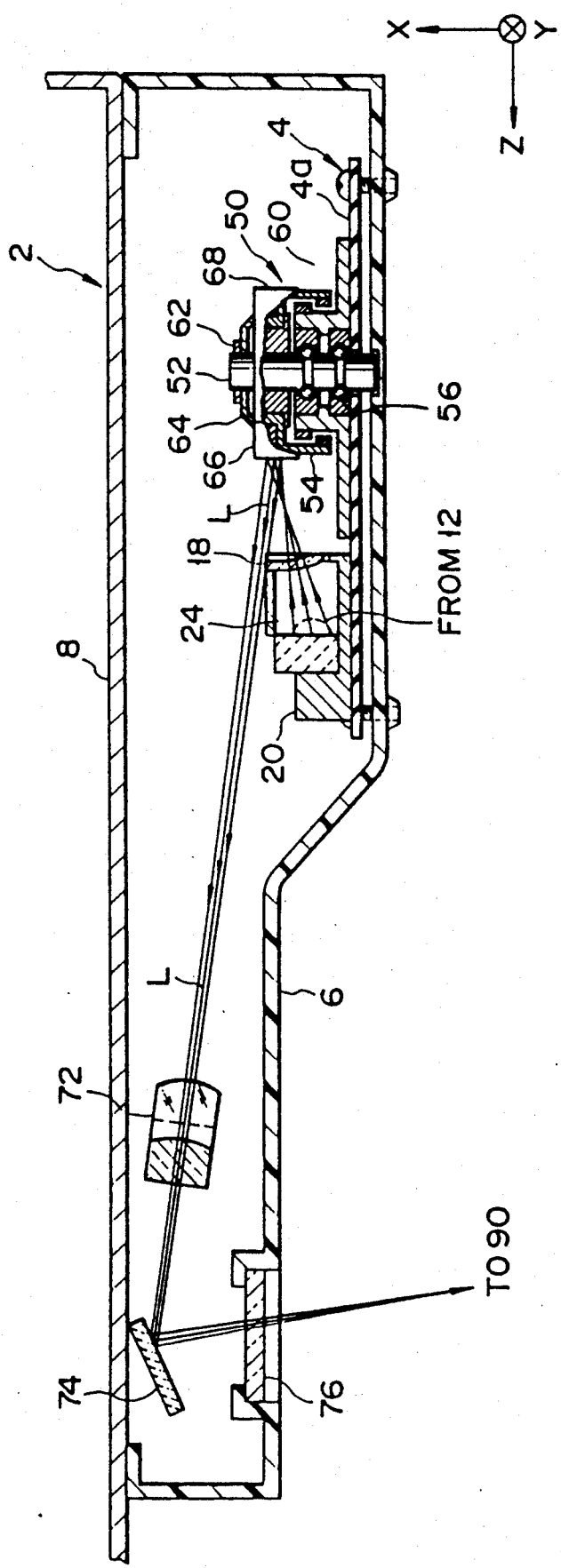
FIG. 1B is a sectional view taken along line I—I in FIG. 1.
Figure 2A:
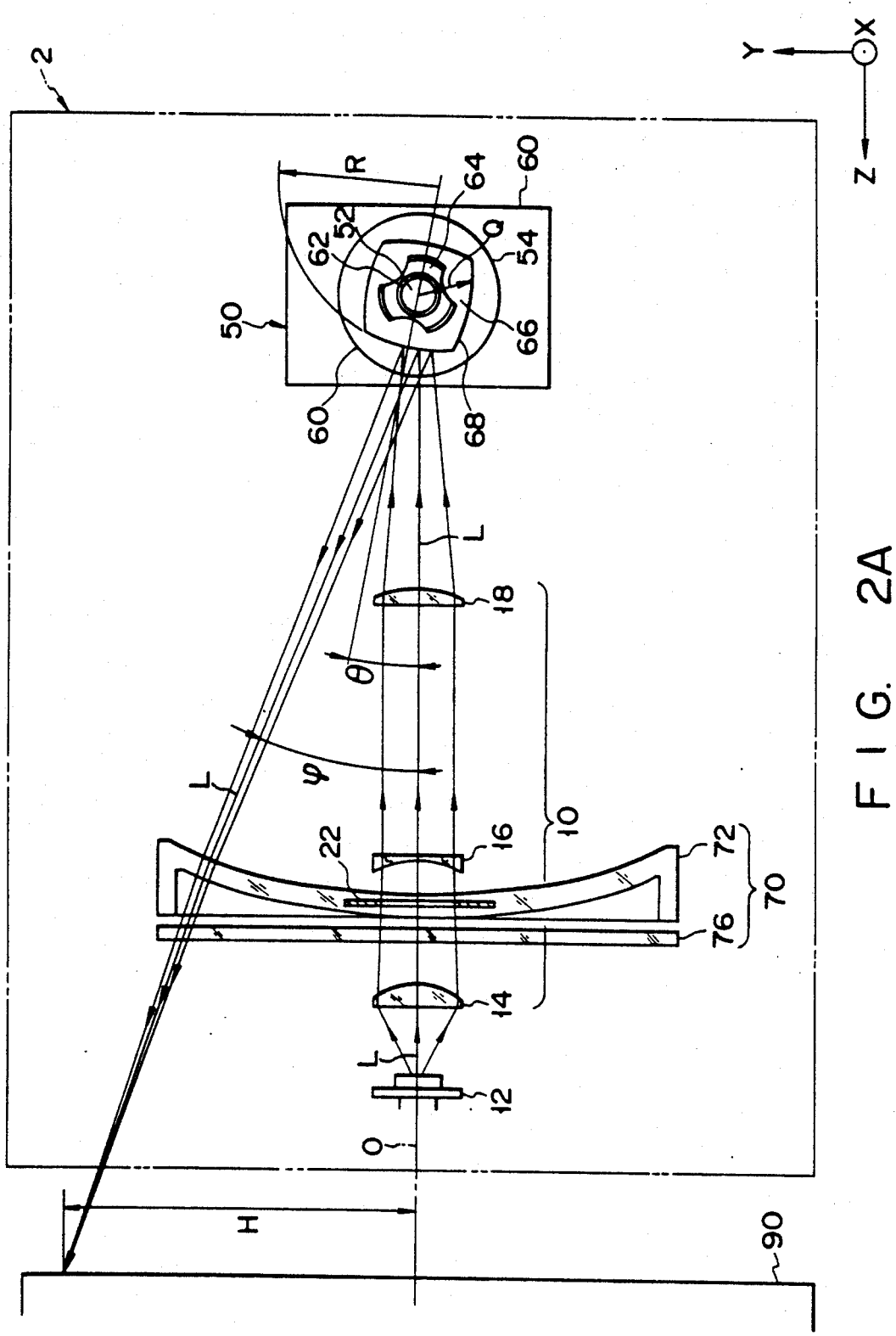
FIG. 2A is a plan view showing the arrangement of optical components of the optical unit, along with laser beam paths.
Figure 2B:
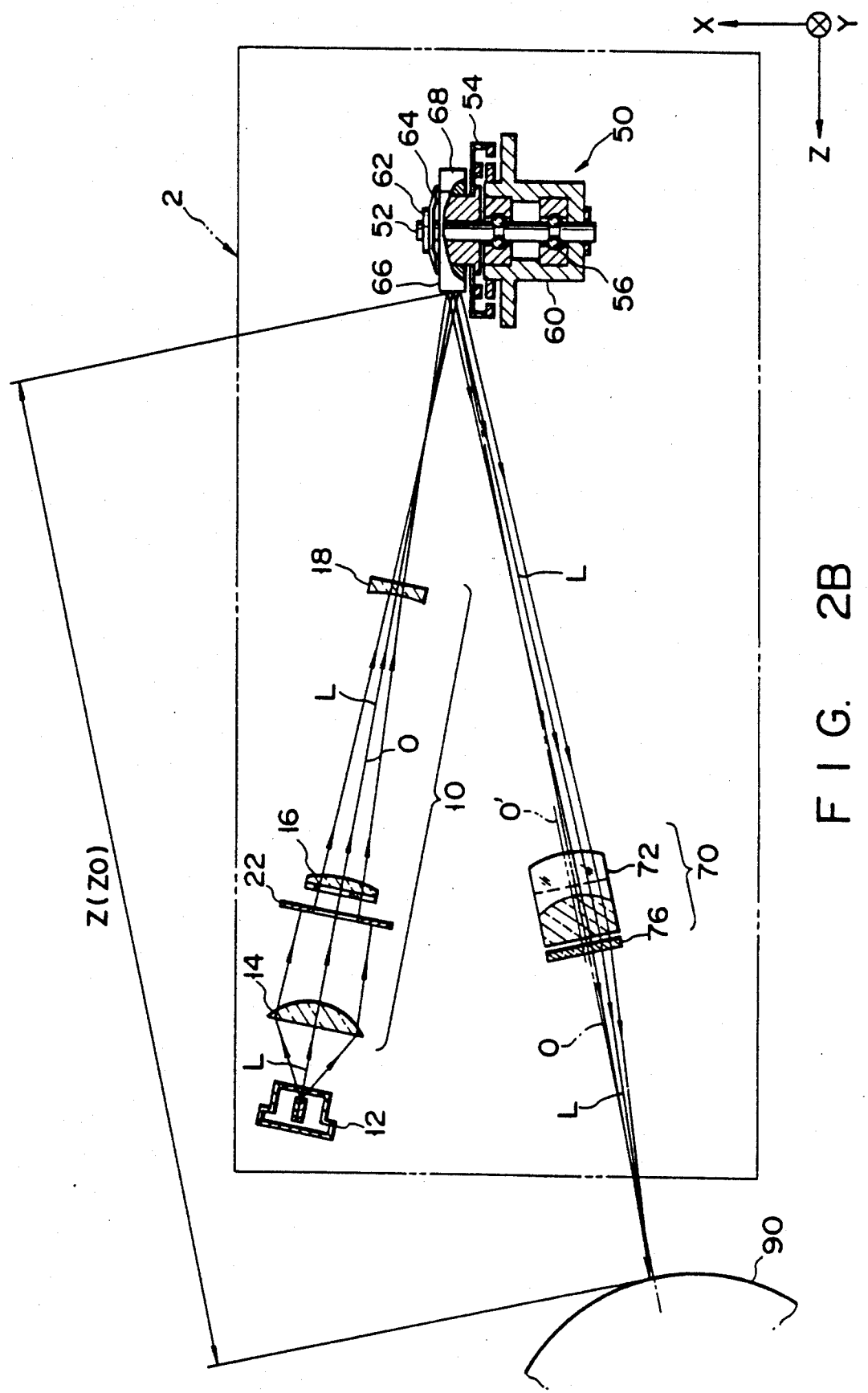
FIG. 2B is a sectional view showing the laser beam paths, the sectional view being obtained by taking the plan view shown in FIG. 2A along a plane which is in the vicinity of a center determined with reference to a main scanning direction.

As is shown in FIGS. 1A and 1B, an optical unit 2 is provided with an outer housing 6 and a base plate 8. The base plate 8 covers the outer housing 6 and seals the interior of the outer housing 6. The base plate 8 constitutes part of a laser beam printer. The optical unit 2 contains: a laser diode 12 for generating a laser beam L; a laser scanning device 4 made up of a first optical system 10 and a scanner 50 which are integrally arranged; and a second optical system 70. The first optical system 10 includes a group of conversion lenses, while the second optical system 70 includes a group of focusing lenses. Although not shown, the optical unit 2 further contains a monitoring optical device which horizontally synchronizes or not a laser beam L and data signal, guided through the first and second optical systems 10 and 70 and used for scanning a photosensitive body 90.

Figures 3A, 3B:
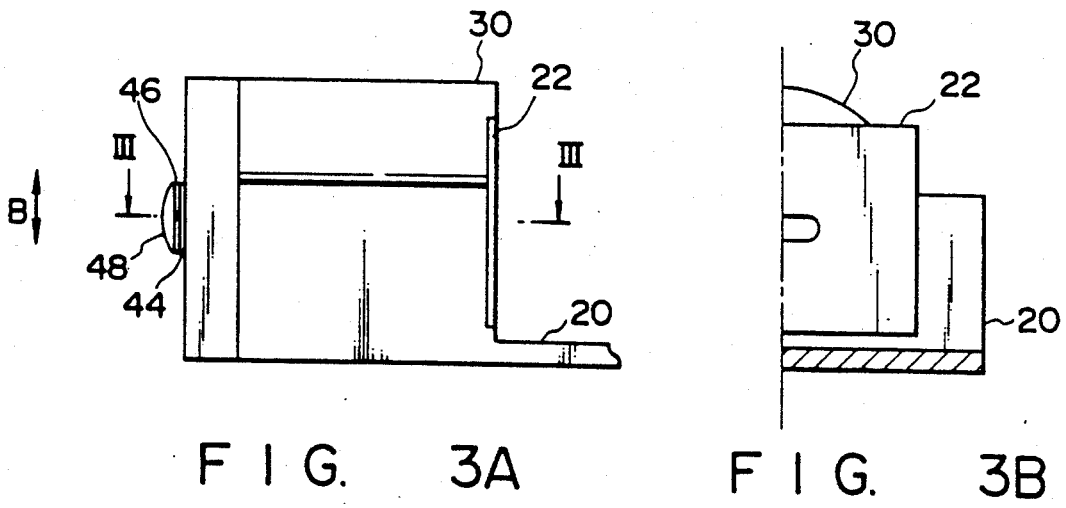
FIG. 3A is a side view of a lens barrel which is to be incorporated in the optical unit shown in FIGS. 1A and 1B, and by which a focusing optical system, a light source, etc. are held.
FIG. 3B is a right side view of the lens barrel shown in FIG. 3A.
Figure 3C:
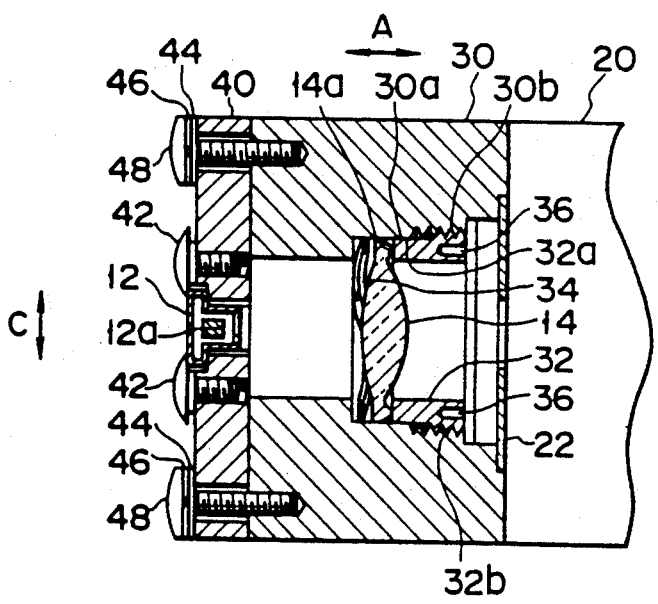
FIG. 3C is a sectional view taken along line III—III shown in FIG. 3A.

The laser scanning device 4 is mounted on an insulating base 4a. This insulating base 4a need not be used if the outer housing 6 is formed of an insulating material. As is shown in FIGS. 3A–3C, the laser diode 12 and at least one lens of the first optical system 10 are assembled in such a manner as to constitute a lens barrel.

The laser beam L generated by the laser diode 12 is converged when it passes through the first optical system 10. The laser beam L is directed to the scanner 50, by which the laser beam L is reflected toward the photosensitive body 90, for scanning it at a nonuniform angular velocity. The laser beam L reflected by the scanner 50 is directed first to the second optical system 70. The laser beam L is focused on a desirable point on the surface of the photosensitive body 90 by the second optical system 70. The laser beam L moves over the photosensitive body 90 in the main scanning direction, with keeping the focused condition due to the second optical system 70, as the reflecting surface of the scanner 50 rotates. The distance over which the laser beam L moves in the main scanning direction from the center of the optical axis to a given point is made to correspond to the angle at which the surface of the scanner 50 rotates. The laser beam L, focused on the photosensitive body 90, is modified or ON-OFF controlled by additional units such as a beam modulator, a data input circuit, etc., (not shown) to form character data and/or graphics data on the surface of the photosensitive body 90. Therefore, an electrostatic latent image is formed on the surface of the photosensitive body 90.

The photosensitive body 90 is rotated in a predetermined direction by a driver (not shown). The electrostatic latent image is formed in accordance with the rotation of the photosensitive body 90. The electrostatic latent image, thus formed, is developed by a developing means (not shown), and is then transferred onto a given transferring material (not shown).

Part of the laser beam L passing through the second optical system 70 is reflected by a horizontal synchronization-detecting mirror (not shown) at each scan performed in the main scanning direction. The reflected laser beam L is guided to a synchronization signal detector (not shown), for the detection of horizontal synchronization.

The first optical system 10 includes: a glass lens 14 which slightly converges the laser beam L produced by the laser diode 12; and first and second plastic lenses 16 and 18 which further converges the laser beam converged by the glass lens 14.

The glass lens 14 is a convex lens formed of optical glass, such as BK7, SK10, etc. As is seen in FIG. 3C, it has a flange 14a by means of which it is held to a lens barrel 30. The first plastic lens 16 is formed of, polymethyl methacrylate (PMMA), etc., and has toric surfaces. The toric surfaces have negative power in the main scanning direction and slightly-negative power in the sub-scanning direction. Although not shown, the first plastic lens 16 has a flange by means of which it is attached to a housing 20. It also has either a positioning-projection or a positioning-recess formed substantially at the center with respect to the main scanning direction.

Like the first plastic lens 16, the second plastic lens 18 is formed of PMMA, etc. It has toric surfaces. The toric surfaces which have positive power in the main scanning direction and negative power in the sub-scanning direction. Although not shown, the second plastic lens 18 has a flange by means of which it is attached to the housing 20. It also has either a positioning-projection or a positioning-recess formed substantially at the center with respect to the main scanning direction.

The scanner 50 includes a polygonal mirror 66 having a plurality of deflecting mirror surfaces 68. Each deflecting mirror surfaces 68 which is convex in the main scanning direction, i.e., the deflecting mirror surfaces 68 is curved with a predetermined radius R of curvature. The number of deflecting mirror surfaces 68 is four in this embodiment, but may be a multiple of four. The polygonal mirror 66 is driven by an axial gap type motor 60. This motor 60 contains: a rotor 54 which is integral with the rotating shaft 52 of the motor 60; a direct bearing 56 which supports the rotating shaft 52 in such a manner as to allow smooth rotation; etc. The polygonal mirror 66 is reliably fixed to the rotor 54 by means of a stop ring 62 and a spring member 64.

The second optical system 70 includes a third plastic lens 72 for focusing a laser beam L on the surface of the photosensitive body 90, and a dust-preventing cover 76 for sealing the above-mentioned optical members of the optical unit 2. With respect to the main scanning direction, the third plastic lens 72 has a face which is shaped to satisfy the relation expressed by $H = f\theta$. In other words, the distance over which the laser beam L ought to move from the optical axis in the main scanning direction in proportion to the angle $\theta$, at which the polygonal mirror 66 or each mirror surfaces 68 thereof is rotated, is made to correspond to the distance H for which the laser beam L scans the photosensitive body 90 in the main scanning direction from the center of the optical axis. With respect to the sub-scanning direction, the third plastic lens 72 functions as a kind of $f\theta$ lens which has positive power and which is curved such that the power decreases in accordance with an increase in the deflection angle $\phi$ with respect to the main scanning direction. Like the first plastic lens 16, the third plastic lens 72 is formed of PMMA, etc., and has either a positioning-projection or a positioning-recess (not shown) formed substantially in the center with respect to the main scanning direction.

The dust-preventing cover 76 is a transparent glass or plastic plate It is formed of optical plate, such as BK7, filter glass, PMMA, or the like. It has a thickness of 2-3 mm, and permits the laser beam L to pass therethrough. In order to cut off a light having such a wavelength as adversely affects the photosensitive body 90, the dust-preventing cover 76 may be provided with a sharp cut filter function.

In the optical unit 2, the first optical system 10 and the second optical system 70 are arranged such that their optical axes form a predetermined angle in a plane expanding in the sub-scanning direction. This arrangement is adopted for the purpose of eliminating ghost laser beam l, to be mentioned later. The laser diode 12 and lenses 14, 16 and 18 of the first optical system 10 are integrally assembled together and are held by the housing 20. The housing 20 contains the lens barrel 30 which will be detailed later with reference to FIGS. 3A–3C. A stop 22 which restricts the intensity or amount of convergent laser beam L, and a first mirror 24 which is arranged between the first and second plastic lenses 16 and 18 to change the traveling direction of the laser beam L, are also held by the housing 20. It should be noted that a second mirror 74 is arranged between the third plastic lens 72 and the dust-preventing cover 76, so as to change the traveling direction of the laser beam L.

The laser beam L generated by the laser diode 12 is converged or collimated by the glass lens 14. When passing through the stop 22, the laser beam L is shaped to have a predetermined cross section. The laser beam L emerging from the stop 22 is guided to the first plastic lens 16. When passing through the first plastic lens 16, the laser beam L is collimated in the main scanning direction and is converged in the sub-scanning direction. The laser beam L, thus processed, is then directed to the second plastic lens 18 via the first mirror 24, as is seen in FIGS. 1A and 1B. When passing through the second plastic lens 18, the laser beam L is converged in both the main scanning direction and sub-scanning direction.

The laser beam L emerging from the second plastic lens 18 is directed to one deflecting mirror surface 68 of the polygonal mirror 66 of the scanner 50. After being reflected by the deflecting mirror surfaces 68, the laser beam L is directed at a nonuniform angular velocity to the third plastic lens 72, which functions as a kind of $f\theta$ lens, as mentioned above. In the main scanning direction, the third plastic lens 72 suppresses the adverse effects caused by the field curve and corrects the distortion aberration to have a desirable value. In the sub-scanning direction, the third plastic lens 72 corrects the positional shift of the laser beam L on the photosensitive body 90, even if each mirror surface 68 of the polygonal mirror 66 tilts. The laser beam L emerging from the third plastic lens 72 is directed to the photosensitive body 90 by way of the dust-preventing cover 76 which is mounted on the housing 6 of the optical unit 2.

The lenses 14, 16, 18, and 72 and the scanner 50 used in the embodiment have such optical characteristics as are shown in Tables 1 and 2 below.

TABLE 1

(Lens characteristics with respect to main scanning direction)

| | First Focusing System | | | | Second Focusing System |
|---|---|---|---|---|---|
| | Glass lens 14 | Lens 16 | Lens 18 | Polygonal Mirror 66 | Lens 72 |
| i | 1 | 2 | 3 | 4 | 5 |
| Power P | 0.0907035 | −0.0134704 | 0.0134029 | −0.025109855 | $-9.92445 \times 10^{-4}$ |
| Focal Length f | 11.0294 | −74.2368 | 74.6107 | −39.825 | $-1.00761 \times 10^{3}$ |
| 1/v' | $3.6 \times 10^{-4}$ | 0.009685 | 0.009685 | $7.08 \times 10^{-4}$ | $9.685 \times 10^{3}$ |
| u | 0.330183 | −0.046247 | 0.0 | −0.046016 | 0.008305 |
| u' | −0.045247 | 0.0 | −0.046016 | 0.008305 | 0.007649 |
| h | 4.15011443 | 3.433239 | 3.433287 | 1.50184 | 0.660993 |
| h²/fv' | $5.624 \times 10^{-4}$ | −0.001538 | 0.00153 | $-4.010 \times 10^{-5}$ | $-4.200 \times 10^{-6}$ |

TABLE 2

(Lens characteristics with respect to sub scanning direction)

| | First Focusing System | | | | Second Focusing System |
|---|---|---|---|---|---|
| | Glass lens 14 | Lens 16 | Lens 18 | Polygonal Mirror 66 | Lens 72 |
| i | 1 | 2 | 3 | 4 | 5 |
| Power P | 0.0907035 | −0.00094897 | −0.0530289 | 0.0 | 0.0221932 |
| Focal | 11.0294 | −1053.77 | −18.8576 | ∞ | 45.0588 |

TABLE 2-continued (Lens characteristics with respect to sub scanning direction)

| | First Focusing System | | | Polygonal Mirror 66 | Second Focusing System Lens 72 |
|---|---|---|---|---|---|
| | Glass lens 14 | Lens 16 | Lens 18 | | |
| Length f | | | | | |
| $1/v'$ | $3.6 \times 10^{-4}$ | 0.09685 | 0.009685 | $7.08 \times 10^{-3}$ | $9.685 \times 10^{-3}$ |
| u | 0.133793 | −0.018740 | −0.017605 | −0.004762 | 0.004762 |
| u' | −0.018740 | −0.017605 | −0.004762 | 0.004762 | −0.005227 |
| h | 1.68167 | 1.19603 | 0.2421888 | 0.048039 | −0.450092 |
| $h^2/fv'$ | $9.234 \times 10^{-5}$ | $-1.315 \times 10^{-5}$ | $-3.012 \times 10^{-5}$ | 0.0 | $4.354 \times 10^{-5}$ |

Next, a description will be given of a structure used for converting the laser beam L generated by the laser into a laser beam L having a cross section of desirable size.

Referring to FIGS. 3A–3C, the glass lens 14 is secured to the lens barrel 30 by means of a push member 32 and an elastic member 34 for example a wave washer, etc. The push member 32 includes a cylindrical portion 32a and a screw portion 32b. The cylindrical portion 32a has a pressing part on that side which contacts the glass lens 14. The position of the glass lens 14 can be adjusted in the direction indicated by arrow A by turning the push member 32. The glass lens 14 has a flange 14a. Since this flange 14a and the pressing part of the cylindrical portion 32a are in line contact with each other, the torque required for turning the push member 32 is small. On the opposite side of the pressing part, a hole 36 is formed in the push member 32. When the position of the glass lens 14 is adjusted, a specially-designed tool is inserted into the hole 36, and the push member 32 is turned by use of the tool. The wave washer 34 urges the glass lens 14 toward the push member 32, and this urging force is constantly applied to the screw portion 32b of the push member 32. Therefore, unnecessary play is eliminated between the screw portion 32b of the push member 32 and the thread of the screw portion 30b of the lens barrel 30. In this fashion, the glass lens 14 is accurately secured to the appropriate position of the lens barrel 30.

The laser diode 12 is fixed to a laser diode holder 40 by means of screws 42. The position of the laser diode holder 40 can be adjusted in the directions indicated by arrows B and C, so that the laser diode holder 40 can be positioned in a desirable manner with reference to the lens barrel 30. The laser diode holder 40 is pressed against the lens barrel 30 with desirable pressure by means of a spring washer 46, a flat washer 44, and a screw 48. With this structure, the direction in which the major component of the laser beam L of the laser diode 12 is emitted can be easily adjusted with reference to the optical axis of the glass lens 14.

The stop 22 is adhered to the lens barrel 30 such that it is located at a focal point of the glass lens 14.

As is shown in FIG. 4, the screw portion 32b of the push member 32 has length n, and the cylindrical portion 32a thereof has length d. When the push member 32 is inserted into the hole section of the lens barrel 30, the cylindrical portion 32a slides along the wall 30a of the hole section of the lens barrel 30, until the screw portion 32b of the push member 32 engages with the screw portion 30a of the lens barrel 30. In this manner, the glass lens 14 is secured at a desirable position with reference to the lens barrel 30. Since the wave washer 34 is interposed between the glass lens 14 and the lens barrel 30, the glass lens 14 can be supported in a desirable position without backlash.

It should be noted that the cylindrical portion 32a can be manufactured with higher precision than the screw portion 32b. When the lens barrel 30 and the push member 32 have been assembled, their optical axes do not tilt with reference to each other. In addition, the glass lens 14 is prevented from tilting and is thus arranged with high accuracy. The angle α at which the glass lens 14 may tilt is determined by: the length d of the cylindrical portion 32a of the push member 32; the outer diameter $D_{32}$ of the cylindrical portion 32a; and the inner diameter $D_{30}$ of the hole section of the lens barrel 30. More specifically, the tilting angle α is given by:

$$\alpha = \tan^{-1}(D_{30} - D_{32})/d$$

As may be understood from this equation, the accuracy with which the glass lens 14 is secured can be improved by increasing the length d of the cylindrical portion 32a and by decreasing the difference between the outer diameter $D_{32}$ of the cylindrical portion 32a and the inner diameter $D_{30}$ of the hollow section of the lens barrel 30.

Figure 5:
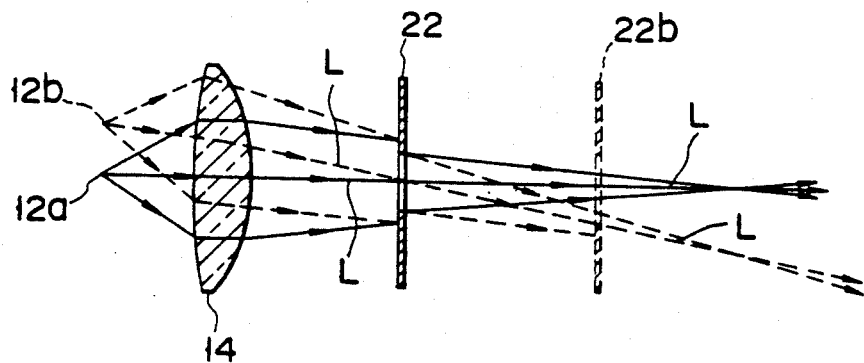
FIG. 5 is a schematic sectional view illustrating the positional relationship between the lens barrel shown in FIGS. 3A–3C and a stop used for restricting the amount of laser beam generated by a laser diode.

Referring to FIG. 5, a laser beam L is generated from the laser-emitting point 12a of the diode laser 12. The laser beam L is converged by the glass lens 14 and restricted by the stop 22 located at the rear-focal plane of the glass lens 14, in such a manner that the laser beam L can form a beam spot of predetermined size. Thereafter, the laser beam L is directed to the photosensitive body 90. Let it be assumed that the stop 22 is located at a position away from the rear-focal plane of the glass lens L, for example, at the position 22b indicated by the broken lines in FIG. 5. In this case, the amount of laser beam L passing through the stop 22 is greatly varied, depending upon the location of the laser-emiting point 12a of the laser diode 12. If the laser-emitting point 12a is shifted to the position indicated by 12b, the amount of laser beam L passing through the stop 22 reduces approximately to half. In other words, in the case where the stop 22 is located at the rear-focal plane of the glass lens 14, the intensity or amount of laser beam L directed to the photosensitive body 90 can remain substantially unchanged, even if the direction in which the major component of the laser beam L generated by the laser diode 12 and the optical axis of the glass lens 14 are shifted from each other.

A description will now be given as to how the characteristics of the laser beam L directed to the photosensitive body 90 from the lens barrel 30 are improved in the present invention.

In this type of optical system, it may happen that the reflecting mirrors of the scanner will not be held accurately at an intended angle (i.e., a so-called mirror tilting problem). If this happens, the point H to which a laser beam is actually irradiated is shifted from the right position h, due to the curvature of the fθ lens. As a result, the fθ characteristics is adversely affected. In addition, the field curvature (i.e., image distortion at the point h to which the laser beam should be irradiated) is also adversely affected. In order to improve the fθ characteristics and the field curvature, as well as other optical characteristics, the mirrors surface 68 of the polygonal mirror 66 are provided with an adequate curvature.

For example, the curvature of the mirrors surface 68 is represented by the formula below, if the angle of rotation of each mirror surface 68 is 0°, $$R/Z_0 = \{1/\cos\theta + \cos\theta/(1+\cos\theta) - 1\}$$

where:

θ is an angle at which the polygonal mirror 66, i.e., each mirror surface 68, is rotated;

Z is the distance between a given deflection point on a mirror 68 and the surface of the photosensitive body 90. The subscript θ of $Z_\theta$ denotes the corresponding angle of rotation of the polygonal mirror 66. If θ=0°, the above distance is represented by $Z_0$; and R is a radius of curvature of each mirror surface 68.

In connection with the above equation, it should be noted that the value of $R/Z_0$ is always greater than 0.5 without reference to the value of 0.

As is well known in the art, where the value of the $R/Z_0$ is greater than 0.5, the characteristics of the laser beam i.e., an image, irradiated onto the photosensitive body are adversely affected. That is, the fθ characteristic, the field curve, the distortion aberration, etc., are adversely affected.

The fθ characteristic will be explained. The fθ characteristic is the difference in F between the following: one is position H to which the laser beam L actually reaches and the other is the theoretical position h which the laser beam L reflected by the mirror 68 reaches. That is, the fθ characteristic F is given by:

$$F = (H - h) \times 100/h(\%)$$
$$= (H - f\theta) \times 100/f\theta(\%)$$

The fθ characteristic varies from "−" to "+" in accordance with an increase in the absolute value of the angle θ of rotation of the mirror 68. The symbols "−" and "+" used with the fθ characteristic indicate how H and h are related to each other in the Y-axis direction, i.e., in the main scanning direction (θ>0). If H>h, the relationship is "+", and if H<h, the relationship is "−". As may be understood from this, the third plastic lens 72 should be an f' lens which is specially shaped such that the power of the center portion of the lens is smaller than that of the circumferential portion. However, if such a special type of fθ lens is used, the field curve is inevitably shifted to the side of the polygonal mirror 66, noted the symbol "+" in accordance with an increase in the angle of rotation of the mirror surface 68. The symbols "+" and "−" used with the field curve indicate the direction in which the focus of the laser beam L directed to the photosensitive body 90 is shifted from a given reference position. If the focus of the laser beam L is shifted from the reference position toward the interior of the photosensitive body 90, the shifting direction is represented by "−". If the focus of the laser beam L is shifted from the reference position in the opposite direction, the shifting direction is represented by "+".

In the embodiment of the present invention, the values of R and $Z_0$ are determined as follows:

$$R = 79.65 \text{ mm}, \; z_0 = 187.12 \text{ mm}$$

Therefore, the curvature of the mirrors surface 68 of the polygonal mirror 66 satisfies the relation $R/Z_0 < 0.5$.

By combining the mirrors surface 68 and the third plastic lens 72 which satisfy the above equations, the field curve and fθ characteristic can be controlled to have adequate values with reference to the surface of the photosensitive body 90.

Figure 6:
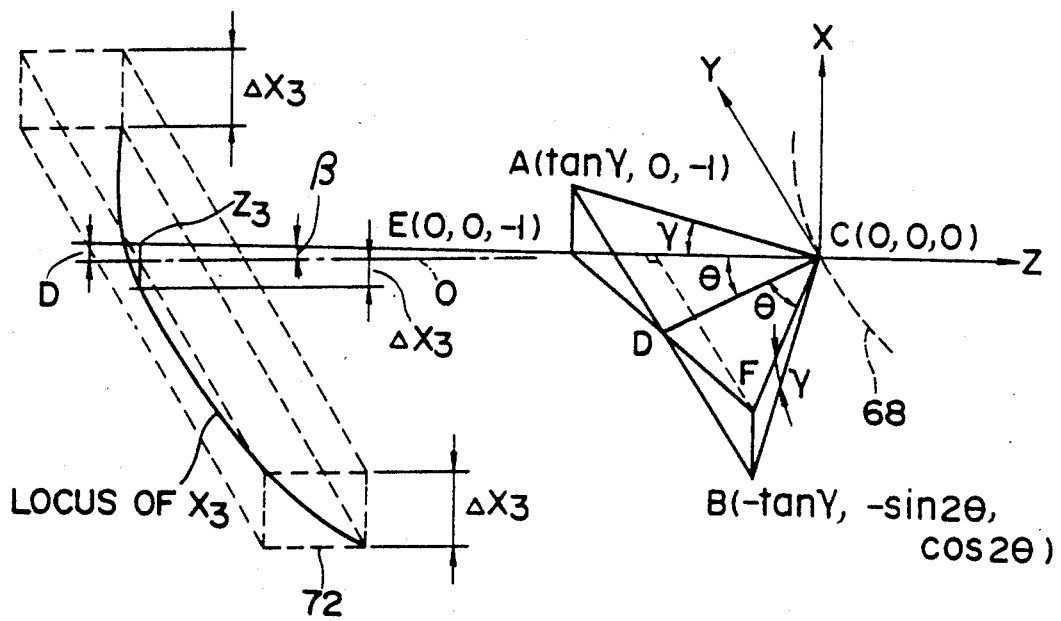
FIG. 6 is a vector diagram showing the characteristics of a laser beam which passes through an scanner incorporated in the optical unit shown in FIGS. 1A and 1B, the characteristics of the laser beam being indicated in relation to the angle formed between a normal line to a mirror and an incident laser beam on the mirror.
Figure 7:
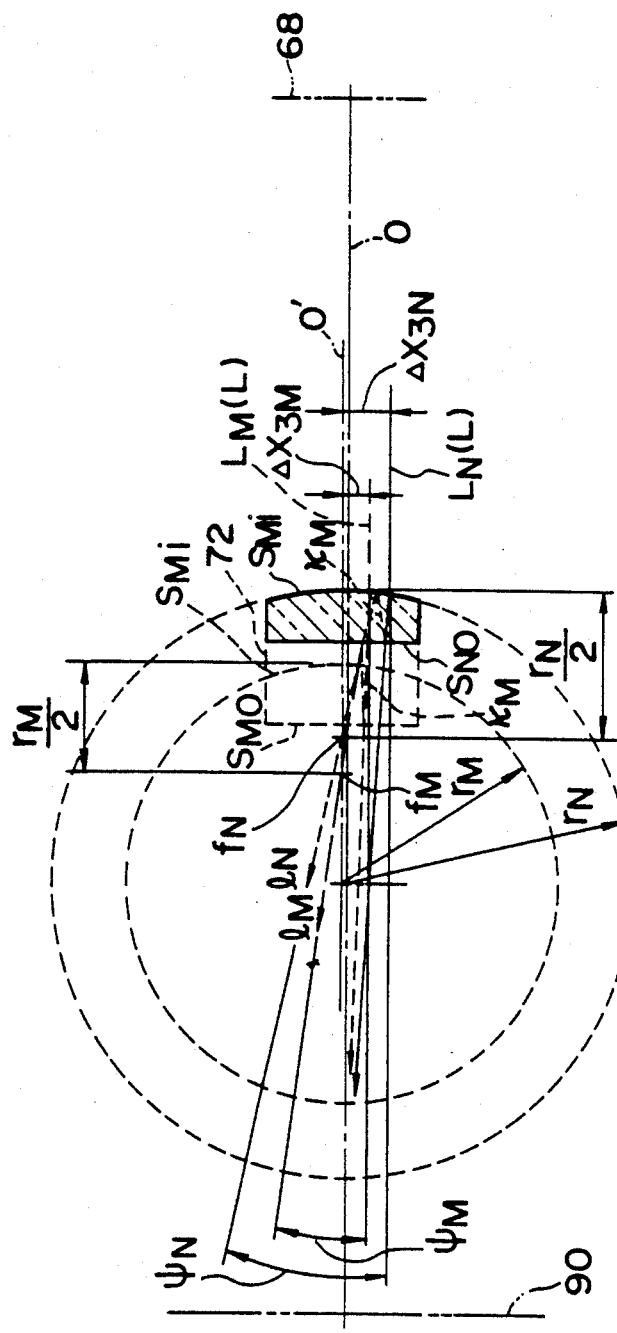
FIG. 7 is a schematic view showing the characteristics of the incident laser beam on a focusing lens incorporated in the optical unit shown in FIGS. 1A and 1B, the characteristics of the laser beam being indicated in relation to a main scanning direction.

FIGS. 6 and 7 illustrate the reason why the ghost laser beam can be eliminated

Let it be assumed that a line which is normal to a mirror surface 68 and which passes through a deflection point C (0, 0, 0) is represented by vector $\overline{CD}$, an incident laser beam is represented by vector $\overline{AC}$, and a reflected laser beam which forms angle θ with reference to vectors $\overline{CD}$ and $\overline{CE}$ is represented by vector $\overline{CB}$ (the length of vector CE = the length of vector CF = 1), as is shown in FIG. 6. In this case, reflected laser beam obtained by projecting vector $\overline{CB}$ on an $\overline{XZ}$ plane is expressed as (−tanγ, −sin2θ, −cos2θ). If the third plastic lens 72 is arranged on the optical axis 0 having an angle β with respect to Z axis, and a projection that the position of the third plastic lens 72 on the optical axis 0 is projected onto the Z axis is denoted by $Z_3$, the intersection $X_3$ between the reflected laser beam (vector $\overline{CB}$) and the third plastic lens 72 is expressed as follows:

$$X_3 = -Z_3 \tan\gamma/\cos2\theta$$

As may be understood from the above, the displacement $\Delta X_3$, i.e., the distance from the reflected laser beam to the Z axis decreases (the absolute value of the deviation increases) in accordance with an increase in the angle θ of rotation of the mirror surface 68 (θ<2/π). A distance D between the Z axis and the optical axis 0 with respect to the position of the coordinates $Z_3$ is determined by $Z_3 \times \tan\beta$. With this in mind, the third plastic lens 72 is provided with a toric surface which can be rotated about an axis perpendicular to the main scanning plane, i.e., a Y axis. By so doing, the laser beam L is prevented from swaying or wavering even if the mirror surfaces 68 tilt. In other words, the laser beam L is prevented from shifting from a point determined with respect to the main scanning direction.

Next, a description will be given of the relationship between a ghost laser beam and a position at which the laser beam L is incident on the third plastic lens 72 (the position being expressed as a distance for which it is located away from the optical axis).

In general, when a laser beam is incident on the first surface of a third plastic lens, it is refracted at a certain angle in the main scanning direction. The laser beam passes through the second surface of the lens, it is refracted in a direction different from the incident laser beam, directed toward a photosensitive body. It should be noted that part of the laser beam incident on the first surface is reflected by the second surface and is returned to the first surface again. Then, the returned laser beam is reflected by the first surface. This laser beam which is reflected twice appears as a ghost laser beam falling on the photosensitive body.

As is shown in FIG. 7, the third plastic lens 72 has different curvatures between the portion which is center in the main scanning direction and the portions which are peripheral in the main scanning direction. The third plastic lens 72 having these different curvatures is arranged such that the optical axis determined with respect to the sub-scanning direction is shifted toward the laser beam incident on each mirror 68.

The laser beam L is incident on the third plastic lens 72, the center of which is shifted from the optical axis, such that the beam is shifted from both the optical axis, determined with respect to the sub-scanning direction, by a predetermined distance and the center of the lens 72. When the laser beam L is incident on the first surface of the third plastic lens 72, it is refracted in the X-axis direction (sub-scaming direction) at a certain angle. When the laser beam L emerges from the second surface of the third plastic lens 72, it is again refracted in a direction different from that in which it is refracted by the first surface, and is then directed to the photosensitive body 90. On the other hand, part of the laser beam L incident on the first surface is reflected by the second surface. The reflected laser beam κ is reflected by the first surface again, and becomes a ghost laser beam l. In the present invention, however, the reflected laser beam κ is reflected by the first surface such that it passes through focussing point $f_m$, due to the curvature which is determined for the first surface in the sub-scanning direction. Since the reflect laser beam κ reflected by the first surface is guided in a different direction from that of the major component of the laser beam L, the ghost laser beam l is divided from the laser beam L. Therefore, the ghost laser beam l is eliminated from the surface of the photosensitive body 90 by adding a light shielding element (not shown).

The reason why the ghost laser beam l can be eliminated in the present invention will be explained in more detail.

As mentioned above, the third plastic lens 72 has different optical characteristics between the portion which is the center in the main scanning direction and the portions which are peripheral in the main scanning direction. With respect to this third plastic lens 72, let it be assumed that: M denotes a central portion of the lens beam 72 in the main scanning direction; N denotes the peripheral portions of the lens 72 where the angle of rotation of each mirror 68 will be larger; $S_{Mi}$ denotes a surface portion which is center with respect to the main scanning direction and on which a laser beam L is incident; $S_{Ni}$ denotes surface portions which are peripheral with respect to the main scanning direction and on which the laser beam L is incident; $S_{Mo}$ and $S_{No}$ denote surface portions from which the laser beam L emerges; $f_M$ and $f_N$ are focal lengths corresponding to the surface portions $S_{Mi}$ and $S_{Ni}$, respectively; and $r_M$ and $r_N$ are radii determining the curvatures of the surface portions $S_{Mi}$ and $S_{Ni}$, respectively. In this case, the focal lengths $f_M$ and $f_N$ are expressed as follows:

$$f_M = r_m/2$$

$$f_N = r_N/2$$

Let it be also assumed that: $L_M$ denotes a laser beam which passes through a portion located in the vicinity of the optical axis determined with respect to the main scanning direction; $L_N$ denotes a laser beam which passes through peripheral portions determined with respect to the main scanning direction; $l_M$ denotes a ghost laser beam produced by the laser beam L incident in the vicinity of the optical axis determined with respect to the main scanning direction; $l_N$ denotes a ghost laser beam produced by the laser beam L incident on the peripheral portions determined with respect to the main scanning direction; and $\psi_M$ and $\psi_N$ denote angles at which the ghost laser beams $l_M$ and $l_N$ are inclined with reference to the major components of laser beams $L_M$ and $L_N$. In this case, inclination angles $\psi_M$ and $\psi_N$ are given by:

$$\psi_M = \Delta X_{3M} \times 2/r_M$$

$$\psi_N = \Delta X_{3N} \times 2/r_N$$

It should be noted that the inclination angles $\psi_M$ and $\psi_N$ are in inverse proportion to the radius r of curvature of each portion of the curved surface of the third plastic lens 72. Therefore, the inclination angle $\psi_M$ of the ghost laser beam $l_M$ is wide in the region where the value of r is small, i.e., the regions in the neighborhood of the center determined with respect to the main scanning direction, while the inclination angle $\psi_N$ of the ghost laser beam $l_N$ is narrow in the region where the value of r is large, i.e., the region in the neighborhood of the peripheral portions determined with respect to the main scanning direction. It should be also noted that the inclination angles $\psi_M$ and $\psi_N$ are in proportion to the deviation of the intersection between the optical axis of the third plastic lens 72 and the laser beam L. Therefore, in the case where the third plastic lens 72 has its optical axis shifted in the direction of the displacement, the value of $\Delta X_3$ varies in accordance with a change in the rotating angle θ of each mirror surface 68 of the polygonal mirror 66. Thus, {$\Delta X_3$} is small in the portions where r is small, and is large in the portions where r is large. In the embodiment of the present invention, the optical axis of the third plastic lens 72 is shifted from the major component of the laser beam L, as mentioned above. In this case, the angle between the ghost laser beam l and the laser beam L is large if the absolute value of the displacement $\Delta X_3$ is large ($\Delta X_{3N}$), and is narrow if the absolute value of the displacement $\Delta X_3$ is small ($\Delta X_{3M}$). In other words, the distance $\Delta X_3$ ($\Delta X_{3N}$) between the major component of the laser beam passing through the third plastic lens 72 and the optical axis of the third plastic lens 72 is long in the region where the angle θ of rotation of each mirror surface 68 of the polygonal mirror 66 is large, whereas the distance $\Delta X_3$ ($\Delta X_{3M}$) between the major component of the laser beam passing through the third plastic lens 72 and optical axis 0' of the third plastic lens 72 is small in the region of the lens center. Therefore, when the laser beam L focused on the photosensitive body 90 is made to move straight line parallel to the main scanning direction, the ghost laser beam l ($l_M$, $l_N$) can be eliminated from even all surface of the third plastic lens 72 while simultaneously suppressing the shifting of the third plastic lens 72.

In regard to the sub-scanning direction, the angle of incidence at which the laser beam L is incident on the third plastic lens 72 is considered substantially 0°. Therefore, the sectional shape of the laser-emerging side of the third plastic lens 72 can be substantially flat in the sub-scanning direction.

The optical axis of the third plastic lens 72 can be shifted with reference to the major component of the laser beam L in two directions: one is the direction approaching the laser beam directed from the first optical system 10 to the mirrors 68 of the polygonal mirror 66, i.e., the "+" side region which is depicted as being upper in FIGS. 6 and 7; and the other is the opposite direction i.e., the "−" side direction which is depicted as being lower in FIGS. 6 and 7. In the optical unit 2 of the present invention, the optical axis of the third plastic lens 72 should not be shifted toward the "−" side since the optical axes of the first and second optical systems 10 and 70 form the predetermined angle. If the optical axis of the third plastic lens 72 is shifted in this direction, the value of the displacement $\Delta X_3$ has to be increased ($\Delta X_{3N}$), so as to isolate the ghost laser beam l from the major component of the laser beam L passing through the third laser beam 72. It should be noted that an increase in the value of the displacement $\Delta X_3$ ($\Delta X_{3M}$) adversely affects the wave front aberration with respect to the photosensitive body 90. Thus, it is desirable in the present invention that the third plastic lens 72 be shifted toward the laser beam L directed from the first optical system 10 to each mirror 68.

Figure 8:
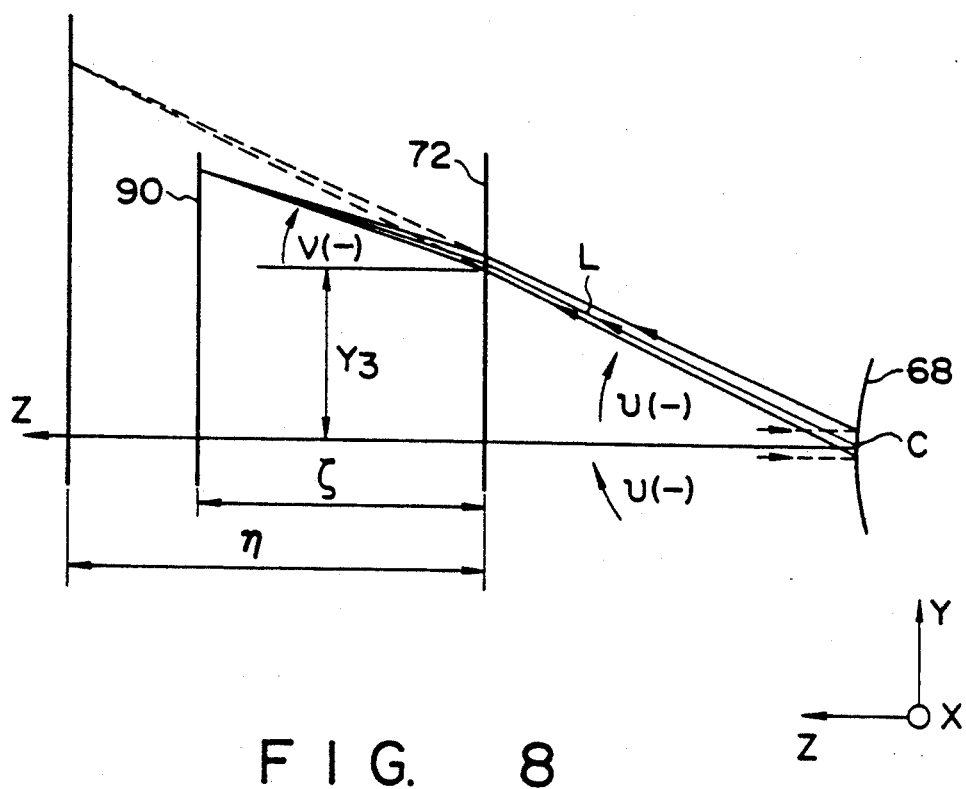
FIG. 8 is a schematic view of optical paths and explains the principle on the basis of which the field curve is corrected by the focusing lens.
Figure 9:
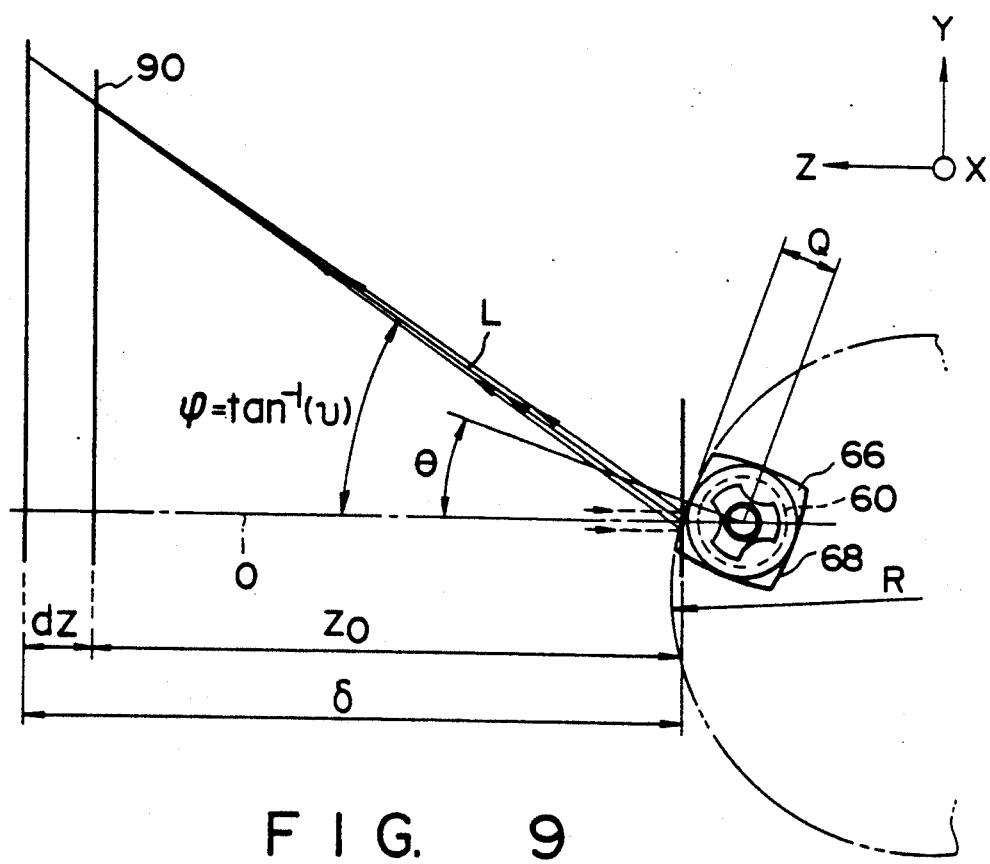
FIG. 9 is a schematic view showing the positional relationship between the focusing lens and a photosensitive body, which are arranged on the basis of the principle shown in FIG. 8.

FIGS. 8 and 9 illustrate principles based on which the characteristics of the images formed on the photosensitive body are improved by the combination of the mirrors and the third plastic lens.

FIG. 8 shows a thin-lens optical system for determining characteristic of the laser beam L in the optical system shown in FIGS. 1A, 1B, 2A and 2B. In FIG. 8, point C indicates the same deflection point as is shown in FIG. 6, and the surfaces of the third plastic lens 72 and photosensitive body are schematically indicated. Reference symbol U denotes inclination of the laser beam directing from the deflection point C to the photosensitive body 90 in the YZ plane, and the inclination in the "−" state is indicated in FIG. 8.

With respect to a thin lens, power $P(Y_3)$ equivalent to the third plastic lens 72 and is located at position $Y_3$ ($Y_3 > 0$) will be considered. From a formula established for a thin lens, the following is obtained:

$$V(Y_3) - U(Y_3) = Y_3 P(Y_3) \quad (1)$$

or $$V(Y_3) = U(Y_3) + Y_3 P(Y_3) \quad (2)$$

By differentiating formula (1) with respect to $Y_3$, the following is obtained:

$$V(Y_3) - U(Y_3)/Y_3 = P(Y_3) + Y_3 \cdot \partial P(Y_3)/\partial Y_3 \quad (3)$$

In FIG. 8, the distance between the third plastic lens 72 and the point to which a laser beam would converge in the absence of the third plastic lens 72 is indicated by $\eta(Y_3)$, and the distance between the third plastic lens 72 and the point to which the laser beam is focused by the third plastic lens 72 is indicated by $\zeta(Y_3)$. It is desirable that the distance $\zeta(Y_3)$ fall within the region between the third plastic lens 72 and the photosensitive body 90 without reference to the value of $Y_3$. Thus, formula (1) or (2) can be rewritten as:

$$1/\partial(Y_3) = \{1/\eta(Y_3)\} + P(Y_3) \quad (4)$$

or $$P(Y_3) = \{1/\partial(Y_3)\} - \{1/\eta(Y_3)\} \quad (5)$$

In order for the third plastic lens to have a characteristic expressed by $h = f\theta$, the value of $\{V(Y_3) - U(Y_3)\}$ has to increase monotonically with an increase in the value of $Y_3$. Thus, the left side of formula (3) has to be larger than 0. That is, it is necessary to satisfy the following relation:

$$\{P(Y_3) + Y_3 \cdot \partial P(Y_3)\}/\partial Y_3 > 0 \quad (6)$$

The effects which environmental conditions, such as the ambient temperature and moisture, may have on the third plastic lens 72 will be considered. In connection with this matter, it is known in the art that the effects which the ambient temperature and/or moisture may have on the third plastic lens 72 is minimum if relation $P(Y_3) = 0$ is established in formulas (4) and (5). Therefore, formula (6) can be rewritten as below, provided that the power $P(Y_3)$ of the third plastic lens 72 is nearly equal to 0 $\{P(Y_3) \approx 0\}$.

$$\partial P(Y_3)/\partial Y_3 > 0 \quad (7)$$

In connection with formula (5), let it be assumed that $P(0) \approx 0$ when $Y_3$ is zero. On the basis of this assumption, the following is obtained:

$$1/\zeta(Y_3) - 1/\eta(Y_3) = P(Y_3) > 0$$

From this relation, the following is obtained:

$$1/\zeta(Y_3) > 1/\eta(Y_3)$$

Hence, $$\zeta(Y_3) < \eta(Y_3)$$

It follows from this relation that a position having a distance $\eta$ in the Z axis direction does not correspond to a position on the photosensitive body 90 having a distance $\zeta$ in the Z axis direction, for every possible value which $\theta$ can take in formula (2). Accordingly, the relation $R/Z_0 < 0.5$ is satisfied.

FIG. 9 shows the arrangement among the polygonal mirror, and the photosensitive body shown in FIG. 8, along with the relationship between the curvature of the polygonal mirror and the inclination between the laser beam L and YZ plane. Let it be assumed that Q denotes the radius of an imaginary circle which is inscribed in the polygonal mirror 66 and which determines the length of one surface of each mirror surface 68, and that R denotes the radius of an imaginary circle which determines how each mirror surface 68 should be curved in the main scanning direction. In this case, the angle between the laser beam L and YZ plane or inclination U is changed by varying the value of Q/R.

FIG. 10 shows how the value of U changes in relation to different values of Q/R ("Q" and "R" being indicated in FIG. 9). Where the equation Q/R = 0 is established and the mirrors surfaces 68 of the polygonal mirror 66 are flat. Where Q/R is smaller, the value of U is larger, i.e., a nonlinearity of the laser beam L is greater. In contrast, where Q/R is larger, the value of U is smaller. Where Q/R is too small, the optical unit 2 occupies too much space in the Y-axis direction, and the wave front aberration of the laser beam L directed to the photosensitive body 90 has an increased value.

Therefore, it is preferable that Q/R be determined within the range of 0.05 to 0.2 more preferably within the range of 0.1 to 0.2.

Figure 11A:
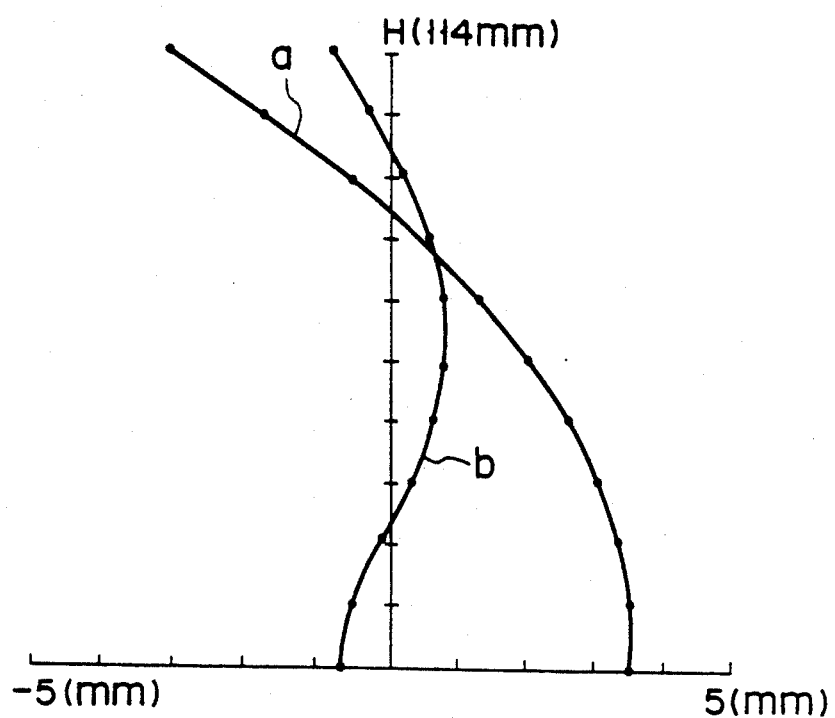
FIGS. 11A and 11B are graphs showing how the field curve and the f$\theta$ characteristic change due to the fact that the focusing lens and the deflection mirror are arranged as shown in FIG. 8.
Figure 11B:
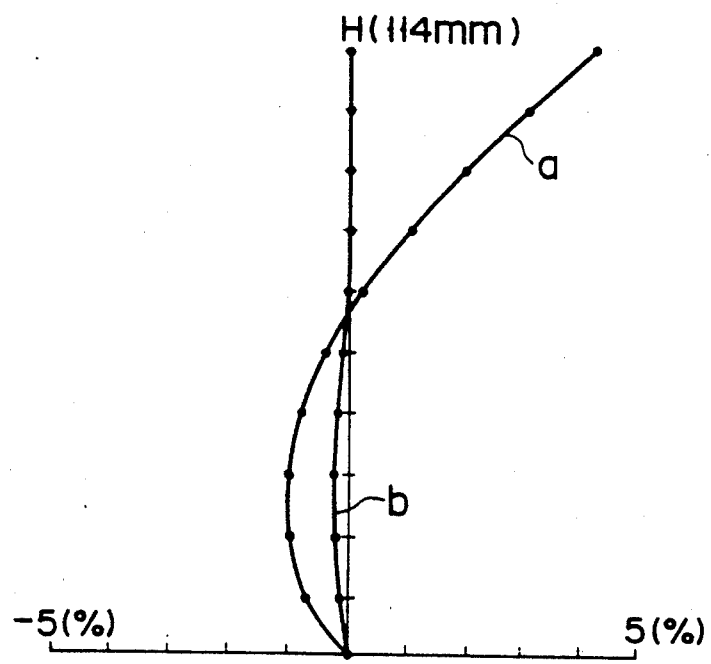

FIGS. 11A and 11B show an example of results obtained by correcting the field curve and/or fθ characteristics by use of the third plastic lens and the polygonal mirror incorporated in the optical unit shown in FIGS. 1A through 2B. In FIGS. 11A and 11B, curves a indicate the characteristics obtained by use only of the polygonal mirror 66, while curves b indicate the characteristics obtained by use of both the polygonal mirror 66 and the third plastic lens 72.

As mentioned above, each mirror of the polygonal mirror is convex in the main scanning direction and is flat in the sub-scanning direction, and the fθ lens has a toric surface and corrects the distortion aberration. Due to the combination of these, the field curve and the positional shift of the laser beam L by tilting of mirrors can be corrected at the same time.

In the present invention, each mirror of the polygonal mirror has a cylindrical face. Therefore, the optical system to which a deflected laser beam is input can be constituted by a single lens. In addition, since this lens can be formed of plastic, it can be fabricated with high precision. It should be also noted that the lens improves the characteristics of the laser beam by which the photosensitive body is exposed, with the result that the field angle can be widened.

In the present invention, the lens which receives a laser beam from the convex deflecting mirror has its optical axis shifted from the major component of the laser beam incident on the lens toward the laser beam directed toward the polygonal mirror. Thus, a ghost laser beam is sufficiently isolated from the major component of the laser beam. In addition, since the lens has a toric surface, the fθ characteristics will be improved at the surface of the photosensitive body. Further, the use of the third plastic lens mentioned above enables a reduction in the size of the entire optical system, although the first and second optical systems are so arranged as to form a certain angle in a plane expanding in the sub-scanning direction.

In the present invention, moreover, the finite lens used for converging the laser beam is aspheric-surface glass. Further, the finite lens is held by inserting the cylindrical portion of the push member along the inner wall of the lens barrel, so that the lens is hardly inclined and its optical axis is hardly shifted.

As may be understood from the foregoing, the optical unit can be small in size. In addition, since the lenses incorporated in the optical unit can be obtained in a simplified process, their prices can be reduced, and the cost for manufacturing the entire optical unit can be reduced as well.

Additional advantages and modifications will readily occur to those skilled in the art. Therefore, the invention in its broader aspects is not limited to the specific details, and representative devices, shown and described herein. Accordingly, various modifications may be without departing from the spirit or scope of the general inventive concept as defined by the appended claims and their equivalents.

What is claimed is:

1. An optical scanning unit adapted for a printer apparatus, comprising:
    means for generating a light-beam;
    means, including a plurality of reflecting faces, for reflecting the light beam from the generating means toward an object, so as to deflect the light beam at a nonuniform angular velocity in accordance with rotation of the reflecting faces that are convex in a main scanning direction and which satisfy the relation:

$$R < 0.5 Z_0$$

wherein R is the maximum radius of curvature of each of the reflecting faces with respect to said main scanning direction, and $Z_0$ is the shortest optical distance between a point of reflection on a reflecting face and a desirable position on an object to be scanned.

2. An optical scanning unit according to claim 1, wherein:
    each of the reflecting faces of the reflecting means satisfies the relation:

$$Q/R = 0.05 \text{ to } 0.2$$

where R is the maximum radius of curvature of said each of the reflecting faces with respect to said main scanning direction, and Q is a radius of an inscribed circle of the reflecting faces; and
    said reflecting means has a radius of curvature determined by Q/R.

3. An optical scanning unit adapted for a printer apparatus, comprising:
    means for generating a light-beam;
    means, including a combination of a plurality of lenses, for converting the light-beam generated by the light-beam generating means into a light beam having a cross section of predetermined size;
    means, including a plurality of reflecting faces, for reflecting the light beam from the converting means toward an object, so as to deflect the light beam at a nonuniform angular velocity in accordance with rotation of the reflecting faces; and
    means for guiding the reflected light beam to the object, so as to linearly scan the object at an constant speed with the light beam having a predetermined beam spot on the object, said guiding means including a plastic lens having at least one toric surface, said lens is located at an angle other than 0° with respect to the converting means, in a plane which expands in a sub-scanning direction and in which an optical axis of the guiding means is contained between the reflecting means and the object, said guiding means including at least one optical axis which is shifted with respect to a major component of a light beam incident on the guiding means toward a light beam traveling from the converting means to the reflecting means.

4. An optical scanning unit according to claim 3, wherein the toric surface is formed on that side of the plastic lens which faces the reflecting means, and the toric surface has a cross section which is concave in a plane expanding a main scanning direction and which is convex in a plane expanding in said sub-scanning direction.

5. An optical scanning unit according to claim 3, wherein the toric surface is formed on that side of the plastic lens which faces the reflecting means and which is rotation-symmetric with reference to an axis extending in a main scanning direction.

6. An optical scanning unit according to claim 3, wherein the plastic lens has an aspheric surface which faces the object and which is rotation-symmetric with reference to an optical axis.

7. An optical scanning unit for a printer apparatus, comprising:

means for generating a light beam;

means for reflecting the light beam from the generating means toward an object to be scanned, said reflecting means having a plurality of reflecting faces which satisfy the relation:

$$R < 0.5 Z_0$$

wherein R is the maximum radius of curvature of each of the reflecting faces with respect to a main scanning direction, and $Z_0$ is the shortest optical distance between a point of reflection on a reflecting face and a desirable position on an object to be scanned.

8. An optical scanning unit for a printer apparatus, comprising:

means for generating a light beam;

means for reflecting the light beam from the generating means toward an object to be scanned, said reflecting means having a plurality of reflecting faces which satisfy the relation:

$$R < 0.5 Z_0$$

wherein R is the maximum radius of curvature of each of the reflecting faces with respect to a main scanning direction, and $Z_0$ is the shortest optical distance between a point of reflection on a reflecting face and a desirable position on an object to be scanned; and means for guiding the reflected light beam toward the object and linearly scanning the object at a constant speed with the light beam, said light beam forming a beam spot of a predetermined size on the object, said guiding means including a lens which has a toric surface facing the reflecting means, and said guiding means correcting field curve and distortion in cooperation with the reflecting means.

* * * * *